United States Patent
Labonte et al.

[11] Patent Number: 6,061,549
[45] Date of Patent: May 9, 2000

[54] SUPPORT OF MULTIPLE MODULATION LEVELS FOR A CELLULAR TRAFFIC CHANNEL

[75] Inventors: Sylvain Labonte, St-Bruno de Montarville; Eric Turcotte, Verdun; Francois Sawyer, St-Hubert; Sylvain St-Pierre, St-Lazare; Francis Lupien, Montreal, all of Canada

[73] Assignee: Telefonaktiebolaget L M Ericsson, Stockholm, Sweden

[21] Appl. No.: 08/804,107

[22] Filed: Feb. 20, 1997

[51] Int. Cl.$^7$ ...................................... H04B 17/00
[52] U.S. Cl. .................... 455/67.3; 455/552; 455/553; 370/465; 371/5.1
[58] Field of Search ...................... 455/466, 403, 455/422, 450, 522, 507, 517, 67.1, 67.3, 552, 553; 370/337, 347, 465, 467, 466, 468; 371/5.1, 5.5

[56] References Cited

U.S. PATENT DOCUMENTS

| | | | |
|---|---|---|---|
| 5,239,667 | 8/1993 | Kanai | 455/10 |
| 5,327,576 | 7/1994 | Uddenfelt et al. | 455/436 |
| 5,345,499 | 9/1994 | Benveniste | 379/59 |
| 5,392,453 | 2/1995 | Gudmundson et al. | 455/33.2 |
| 5,396,253 | 3/1995 | Chia | 342/104 |
| 5,396,645 | 3/1995 | Huff | 455/33.4 |
| 5,457,680 | 10/1995 | Kamm et al. | 370/17 |

FOREIGN PATENT DOCUMENTS

| | | |
|---|---|---|
| 0 415 502 | 3/1991 | European Pat. Off. . |
| 0 472 511 | 2/1992 | European Pat. Off. . |
| 2 718 906 | 10/1995 | France . |
| WO 92/12602 | 7/1992 | WIPO . |
| WO 92/22162 | 12/1992 | WIPO . |
| WO 96/05708 | 2/1996 | WIPO . |

OTHER PUBLICATIONS

PCT International Search Report, Nov. 26, 1998, PCT/SE98/00308.
*Estimation of the Performance of Link Adaptation in Mobile Radio* by J. Dunlopt, Irvine and P. Cosimini Department of Electronic and Electricial Engineering, University of Straithclyde, Glasgow, G1 1XW, Scotland RACE Mobile Telecommunications Summit Cascais, Portugal, (Nov., 22–24, 1995) (pp. 326–330).
*Estimation of the Performance of an Adaptive Air Interface in Mobile Radio* by J. Dunlopt, P. Cosimini, G. Graham and E. Le Strait Department of Electronic and Electrical Engineering, University of Straithclyde, Glasgow, G1 1XW, Scotland RACE Mobile Telecommunications Workshop, Amsterdam (May 17–19, 1994).
*Cell Selection in Two–Tier Microcellular/Macrocellular Systems* by Mathilde Benveniste, AT&T Bell Laboratories, Whippany, New Jersey 07981.
*A Summary of Cell Selection in Two–tier Microcellular/Macrocellular Systems* by AT&T NSI.

*Primary Examiner*—Nguyen Vo
*Assistant Examiner*—Darnell R. Armstrong
*Attorney, Agent, or Firm*—Jenkens & Gilchrist P.C.

[57] ABSTRACT

A D-AMPS+ cellular communications air interface is presented wherein a packet data control channel and packet data traffic channel is supported in addition to the conventional digital control channel and digital traffic channel. In particular, the packet data control channel, packet data traffic channel and digital traffic channel support multiple modulation level operation (high versus low). Procedures are provided for intracell and intercell modulation transition of mobile station communications carried by a traffic channel. In particular, these procedures facilitate intracell and intercell modulation transition to a traffic channel using the same level of modulation, as well as intracell and intercell (fall-forward and fall-backward) modulation transition to a traffic channel using a different level of modulation.

32 Claims, 6 Drawing Sheets

SUPPORT OF MULTIPLE MODULATION LEVELS FOR A CELLULAR TRAFFIC CHANNEL

BACKGROUND OF THE INVENTION

1. Technical Field of the Invention

The present invention relates to the air interface of a cellular telephone network and, in particular, to an air interface of a cellular telephone network supporting multiple modulation levels for communications.

2. Description of Related Art

The TIA/EIA Interim Standard IS-136 specified air interface of the digital advanced mobile phone service (D-AMPS) system separates the allocated cellular frequency spectrum into a plurality of thirty-kilohertz channels. Each channel is divided into 6.67 millisecond (ms) time slots, with three consecutive time slots forming a time division multiple access (TDMA) block. The modulation scheme used is differential quadrature phase shift keying (DQPSK), a relatively low-level modulation (LLM), with onehundred sixty two symbols (of two bits each) per time slot.

Two types of channels are defined for the conventional air interface: the digital control channel (DCCH) and the digital traffic channel (DTC). The digital control channel is a multi-user channel that is used for controls and services such as registration, authentication, call setup, and the like. The digital traffic channel is a circuit switched single user channel that is assigned at call setup and handoff, and is used to handle a voice and/or data communication between users of the cellular system and users in a fixed or other cellular system. The D-AMPS standard supports full-rate, double-rate and triple-rate digital traffic channels for user data communications using one, two and three time slots per block, respectively,.

On the downlink over the D-AMPS air interface, every time slot, whether used for a digital control channel or a digital traffic channel, carries one-hundred thirty symbols of user information. This equates to a transfer of two-hundred sixty bits of user information every twenty milliseconds. Thus, each slot supports a communications rate of thirteen kilobits per second (kb/s). In practice, however, the actual information transfer rate is much less due to the inclusion of error protection bits. For example, voice traffic is transmitted over a full-rate digital traffic channel using approximately five kb/s of error protection for the approximately eight kb/s of digitized speech provided by a vocoder. For data traffic, on the other hand, the transmission over a full-rate thirteen kb/s digital traffic channel is made with a corresponding data rate of 9.6 kb/s.

The permitted data rates for voice and data communications over the digital traffic channel may be increased if double-rate or triple-rate traffic channels are used. The main difficulty or drawback with the use of multi-slot (i.e., multi-rate) operation is that the mobile stations which are being used for the communications utilize idle digital traffic channel time slots, where no communications over the air interface with the base station are being made, to make mobile assisted handoff (MAHO) measurements of the received signal strength from neighboring base stations. When configured for triple-rate voice or data communications, the mobile station is in essence communicating continuously, which leaves no time for making signal strength measurements. Frame stealing, wherein the mobile station interrupts communication for one or more time slots to make signal strength measurements, has been proposed as a possible solution to support multi-slot, and in particular triple-rate, communications. This is not a preferred solution as some communications data loss or interruption in communications continuity may occur.

A modification of the D-AMPS system has been proposed (referred to as D-AMPS+) which would enable higher rate communications without the need for multi-slot operation. For voice communications, a high-rate vocoder is used to provide higher quality digitized speech, and a high-level modulation (HLM) scheme providing more bits per transmitted symbol, such as sixteen level quadrature amplitude modulation (16-QAM), is then implemented on the digital traffic channel to increase the payload capable of being carried in each time slot. The use of high-level modulation is complementary to multi-slot operation to achieve the highest capacity in a radio channel of a given bandwidth. High-level modulation is thus preferred for a number of reasons. First, it preserves network capacity. Second, it minimizes power consumption in the mobile station, resulting in a longer talk time. Third, it facilitates conventional mobile station operation in making MAHO signal strength measurements during idle time slots. In summary, D-AMPS+ maintains the same air interface slot structure as in D-AMPS, thus insuring backward compatibility, while simultaneously providing for higher throughput due to its support of a high-level modulation scheme.

An enhancement of the D-AMPS system has also been proposed which would facilitate the support of packet data communications over the air interface and compatibility with the cellular digital packet data (CDPD) network. In the enhanced D-AMPS system, two new types of packet data channels are provided. The first is a packet control channel (PCCH) which comprises a multi-user channel much like the previously described digital control channel (DCCH), and also used for controls and services such as registration, authentication, call setup, and the like, as well as for the transmission of data packets. The second is a packet traffic channel (PTCH) comprising a single user channel much like the previously described digital traffic channel (DTC), again assigned at call setup, and used to handle a packet data communication between users. The structure of these channels is very much like that of the D-AMPS channels, and the channels utilize the relatively low-level differential quadrature phase shift keying (DQPSK) modulation scheme. Again, multi-slot (up to three slots for triple-rate) operation of the channels is supported providing a maximum aggregate user payload of approximately thirty kb/s. Similar drawbacks as discussed above with respect to digital traffic channel multi-rate operation are encountered with multi-rate packet traffic channel operation.

The high level modulation also applies to packet channels (traffic or control). Mobile stations capable of operation using only the low-level modulation scheme (i.e., enhanced D-AMPS only mobiles) are assigned to use the low-level modulation packet control channel and packet/digital traffic channels. D-AMPS+ mobile stations, on the other hand, may be assigned the high-level or low-level modulation packet control channel and packet/digital traffic channels depending on channel conditions (such as interference, bit error rate, word error rate, fading rate and the like).

For such D-AMPS+ mobile stations, a mechanism is needed for effectuating the selection of and a transition of operation between the low-level modulation and high-level modulation on the digital traffic channels and the packet traffic channels. The present invention provides such a mechanism.

SUMMARY OF THE INVENTION

In a D-AMPS+ cellular system, the communications air interface supports a packet data control channel and packet data traffic channel in addition to the conventional digital control channel and digital traffic channel. The digital traffic channel, packet data control channel and packet data traffic channel further support multiple modulation level operation (high versus low). The present invention provides procedures for effectuating modulation level transitions, both intracell and intercell, of mobile station communications carried by a traffic channel.

In a first procedure, air interface communications quality is monitored in connection with a communication carried by a low-level modulation traffic channel. If the air interface communications quality is sufficient, a fall-forward transition to a high-level modulation traffic channel may occur. If the foregoing condition is not met, a transition from the currently utilized low-level modulation traffic channel to another low-level modulation traffic channel may occur. In either case, the transition may be effectuated to a traffic channel assigned to a currently serving cell (i.e., intracell), or to another cell (i.e., intercell).

In a second procedure, air interface communications quality is monitored in connection with a communication carried by a high-level modulation traffic channel. If the air interface communications quality is insufficient, a fall-backward transition to a low-level modulation traffic channel occurs. If the foregoing condition is not met, a transition from the currently utilized high-level modulation traffic channel to another high-level modulation traffic channel may occur. In either case, the transition may be effectuated to a traffic channel assigned to a currently serving cell (i.e., intracell), or to another cell (i.e., intercell).

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1A:
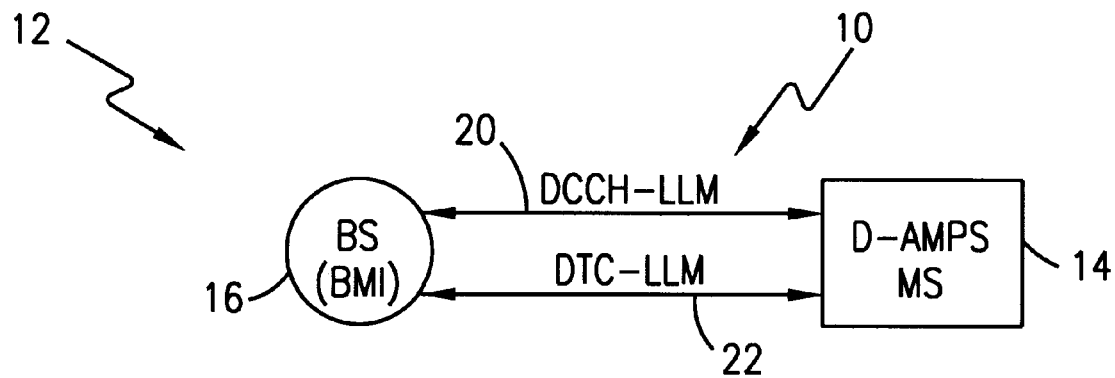
FIGS. 1A–1C are block diagrams illustrating the channel content of the air interface in a digital advanced mobile phone service (D-AMPS) system, an enhanced D-AMPS system, and a D-AMPS+ system, respectively.

Reference is now made to FIG. 1A wherein there is shown a block diagram illustrating the channel content of the air interface 10 in a digital advanced mobile phone service (D-AMPS) system 12. The air interface 10 supports radio frequency voice and data communications between a mobile station 14 and a base station 16 (also referred to as a base station/mobile switching center/interworking unit (BMI)). Other components of the D-AMPS system 12 (like a base station controller, mobile switching center, home/visitor location center, and the like) are known to those skilled in the art, and are not shown in order to simplify the illustration. The D-AMPS system 12 air interface 10 conventionally supports two types of channels: the digital control channel (DCCH) 20 and the digital traffic channel (DTC) 22. The digital control channel 20 is a multi-user channel that is used for controls and services such as registration, authentication, call setup, and the like. The digital traffic channel 22 is a circuit switched single user channel that is assigned at call setup and handoff, and is used to handle a voice and/or data communication between users. A relatively low-level modulation (LLM) scheme comprising differential quadrature phase shift keying (DQPSK) is used for communicating over either the digital control channel 20 or the digital traffic channel 22 (with one slot used for voice, and up to three slots used for data).

Figure 1B:
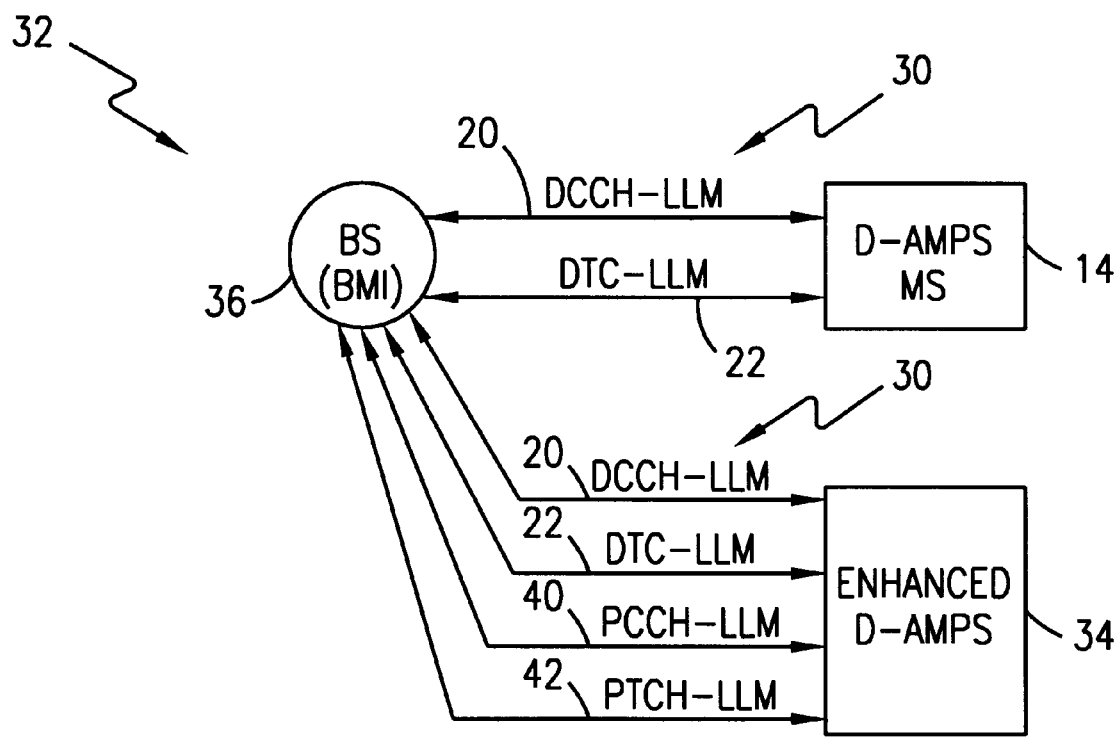

Reference is now made to FIG. 1B wherein there is shown a block diagram illustrating the channel content of the air interface 30 in an enhanced D-AMPS system 32. The air interface 30 supports radio frequency voice and data communications between a conventional D-AMPS mobile station 14 and/or a mobile station 34 and a base station 36 (also referred to as a base station/mobile switching center/interworking unit (BMI)). Other components of the enhanced D-AMPS system 32 (like a base station controller, mobile switching center, home/visitor location center, and the like) are known to those skilled in the art, and are not shown in order to simplify the illustration. The enhanced D-AMPS system 32 air interface 30 supports the conventional D-AMPS channels comprising the digital control channel (DCCH) 20 and the digital traffic channel (DTC) 22 (described above), as well as a packet control channel (PCCH) 40 and a packet traffic channel (PTCH) 42. The packet control channel 40 is a multi-user channel that is used for controls and services such as registration, authentication, call setup, and the like, and is further used for the transmission of data packets. The packet traffic channel 42 is a single user channel that may be allocated for use when packet data transmission is needed and then used to handle a packet data communication between users. As with the conventional D-AMPS channels 20 and 22, the structure of the enhanced packet control and packet traffic channels 40 and 42 utilizes a relatively low-level modulation (LLM) scheme comprising differential quadrature phase shift keying (DQPSK).

Figure 1C:
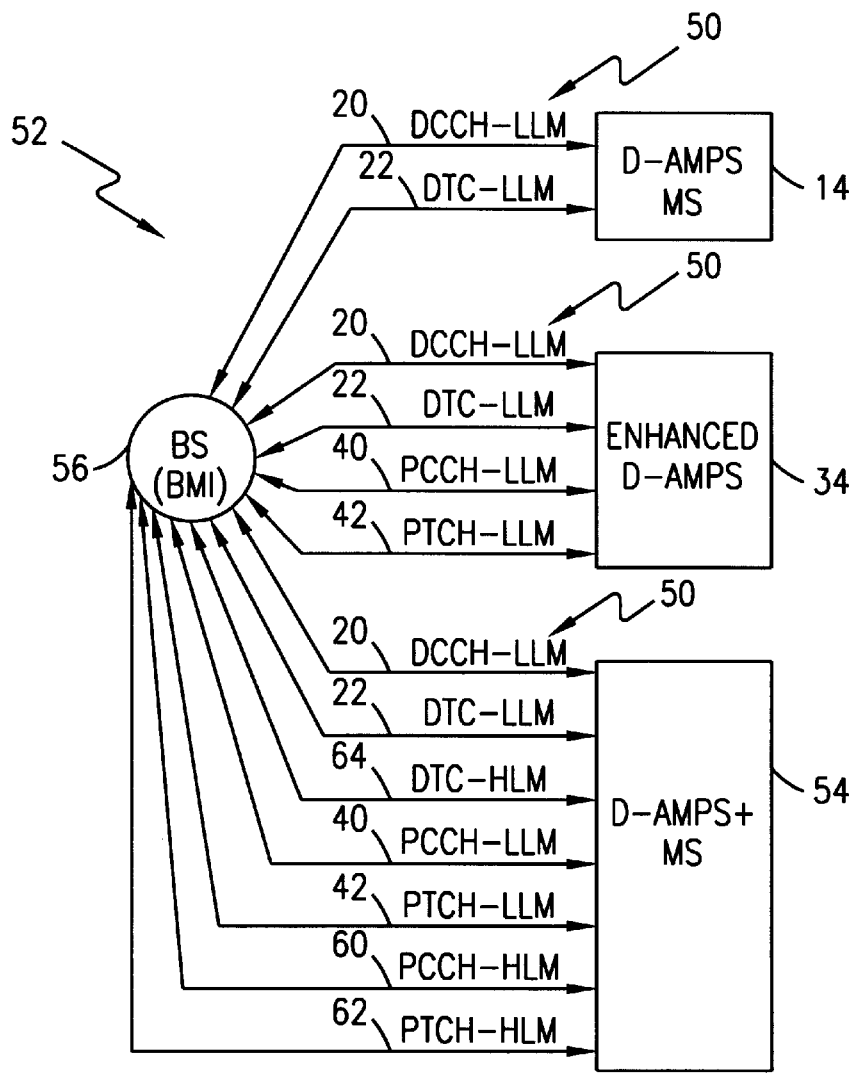

Reference is now made to FIG. 1C wherein there is shown a block diagram illustrating the channel content of the air interface 50 in a D-AMPS+ system 52. The air interface 50 supports radio frequency voice and data communications between a conventional D-AMPS mobile station 14, a mobile station 34 and/or a D-AMPS+ mobile station 54 and a base station 56 (also referred to as a base station/mobile switching center/interworking unit (BMI)). Other components of the D-AMPS+ system 52 (like a base station controller, mobile switching center, home/visitor location center, and the like) are known to those skilled in the art, and are not shown in order to simplify the illustration. The D-AMPS+ system 52 air interface 50 supports the conventional D-AMPS channels comprising the low-level modulation digital control channel (DCCH) 20 and the low-level modulation digital traffic channel (DTC) 22 (described above), and the enhanced D-AMPS low-level modulation (LLM) packet control channel (PCCH) 40 and low-level modulation packet traffic channel (PTCH) 42 (as described above), as well as a packet control channel (PCCH) 60, a packet traffic channel (PTCH) 62 and a digital traffic channel (DTC) 64. The packet control channel 60 is a multi-user channel that is used for controls and services such as registration, authentication, call setup, and the like, and is also used for packet data transmissions. The packet traffic channel 62 is a single user channel that may be allocated for use when packet data transmission is needed and then used to handle a packet data communication between users. The digital traffic channel 64 is also a multi-user channel that is circuit switched and used for voice communications between users. Unlike the conventional D-AMPS or enhanced D-AMPS channels 20, 22, 40 and 42, the structure of the D-AMPS+ packet control and packet traffic channels 60 and 62, and digital traffic channel 64, utilizes a relatively high-level modulation (HLM) scheme comprising, for instance, sixteen level quadrature amplitude modulation (16-QAM) or eight level phase shift keying (8-PSK).

A mobile station capable of operation using only the low-level modulation (LLM) scheme (comprising, for example, the conventional D-AMPS mobile station 14 or the enhanced D-AMPS mobile station 34), uses only the low-level modulation for communications over the digital control channel 20, digital traffic channel 22, packet control channel 40 or packet traffic channel 42. A D-AMPS+ mobile station 54, on the other hand, may selectively utilize either low-level modulation or high-level modulation. For communications using the digital control channel 20, only low-level modulation is supported by the air interface 50 and hence is used by the mobile station 54 and base station 56. For communications over either the packet control channels 40 and 60 or packet traffic channels 42 or 62, or the digital traffic channels 22 or 64, however, both low-level modulation and high-level modulation is supported by the air interface 50. Thus, the mobile station 54 and/or base station 56 may selectively choose, and if necessary switch among and between, low-level modulation and high-level modulation for its communications depending on a number of factors including channel conditions (such as interference, bit error rate, word error rate, fading rate and the like).

In any event, operation of the system using the high-level modulation for data communications (uplink or downlink, control or traffic, circuit or packet) is preferred because of its inherent relative efficiencies and better performance. The high-level modulation scheme requires a higher channel quality though and is thus more sensitive to channel degradation and fast fading. Fast fading occurs as a result of time varying multipath radio waves between transmitter and receiver. The fading rate is proportional to mobile station speed, and thus a higher bit error rate is experienced. Often times the rate is beyond the corrective capabilities of a utilized signal coding and interleaving for the D-AMPS+ high level modulation. Accordingly, appropriate procedures must be implemented to give preference to operation in high-level modulation, while at the same time supporting low-level modulation operation, and dynamic change between low and high, when channel conditions so warrant.

Figure 2:
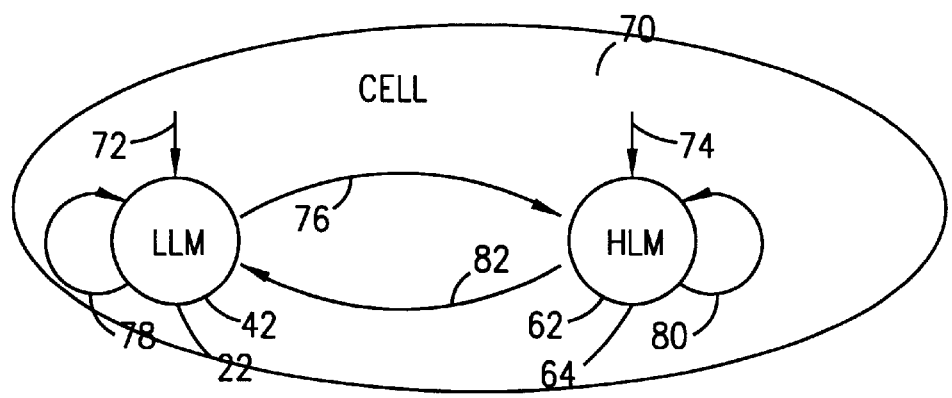
FIG. 2 is a state transition diagram illustrating D-AMPS+ system operation using low-level modulation or high-level modulation for traffic channel communications implicating intracell modulation transitions.

Reference is now made to FIG. 2 wherein there is shown a state transition diagram illustrating D-AMPS+ system 52 operation using low-level modulation or high-level modulation for traffic channel 22, 42, 62 or 64 communications implicating an intracell modulation transitions. In this situation, the low-level modulation traffic channels (DTC-LLM) 22 and (PTCH-LLM) 42 and the high-level modulation traffic channels (DTC-HLM) 64 and (PTCH-HLM) 62 are supported in the same cell 70. In fact, it should be remembered that each cell 70 supports a plurality of low-level modulation traffic channels 22 or 42 and a plurality of high-level modulation traffic channels 62 or 64. The cell 70 may exist within a hierarchical (or layered) cell structure, and thus comprise a pico-cell, a micro-cell, a macro-cell, or an umbrella cell.

The procedure first assumes that a traffic channel call setup 72 or 74 with the mobile station 54 in cell 70 is being implemented. Preferably, the default implemented by the system is a call setup 72 to the low-level modulation traffic channel 22 or 42 if the cell 70 is a large micro-cell, a macro-cell, or an umbrella cell, and a call setup 74 to the high-level modulation traffic channel 62 or 64 if the cell 70 is a pico-cell or a small micro-cell.

It is now assumed that a traffic channel communication with the mobile station 54 (perhaps following a setup 72) is being handled by one of the cell 70 supported plurality of low-level modulation traffic channels 22 or 42. In order to continue handling of the traffic channel communication as the mobile station 54 operates within the cell 70 and communications quality on the current channel degrades, an intracell transition is first implicated to switch among and between the plurality of channels 22, 42, 62 and 64 supported by the cell 70. Communications quality on other low-level modulation traffic channels 22 or 42 and on the high-level modulation traffic channels 62 and 64 is evaluated. Factors affecting quality which may be evaluated include, mobile station speed, bit error rate, word error rate, carrier-to-interference ratio, fading rate and the like. If the quality on one of the high-level modulation traffic channels 62 and 64 within the cell 70 is sufficient, an intracell transition fall-forward 76 is performed. If the quality on all of the high-level modulation traffic channels 62 or 64 within the cell 70 is insufficient, but the quality on another low-level modulation traffic channel 22 or 42 is sufficient, an intracell transition 78 is performed.

It is now assumed that a traffic channel communication with the mobile station 54 (perhaps following a setup 74) is being handled by one of the cell 70 supported plurality of high-level modulation traffic channels 62 or 64. In order to continue handling of the traffic channel communication as the mobile station 54 operates within the cell 70 and communications quality on the current channel degrades, an intracell transition is first implicated to switch among and between the plurality of channels 22, 42, 62 and 64 supported by the cell 70. Communications quality on other high-level modulation traffic channels 62 and 64 and on the low-level modulation traffic channels 22 and 42 is evaluated. Factors affecting quality which may be evaluated include, mobile station speed, bit error rate, word error rate, carrier-to-interference ratio, fading rate and the like. Operation in high-level modulation is preferred, and accordingly the system first attempts to find another one of the high-level modulation traffic channels 62 or 64 within the cell 70 with sufficient quality and perform an intracell transition 80. If the transition 80 is unsuccessful, or if the quality on the other high-level modulation traffic channels 62 or 64 within the cell 70 is insufficient, and further if the quality on one of the low-level modulation traffic channels 22 or 42 within the cell 70 is sufficient, an intracell transition fall-backward 82 is performed.

Figure 3A:
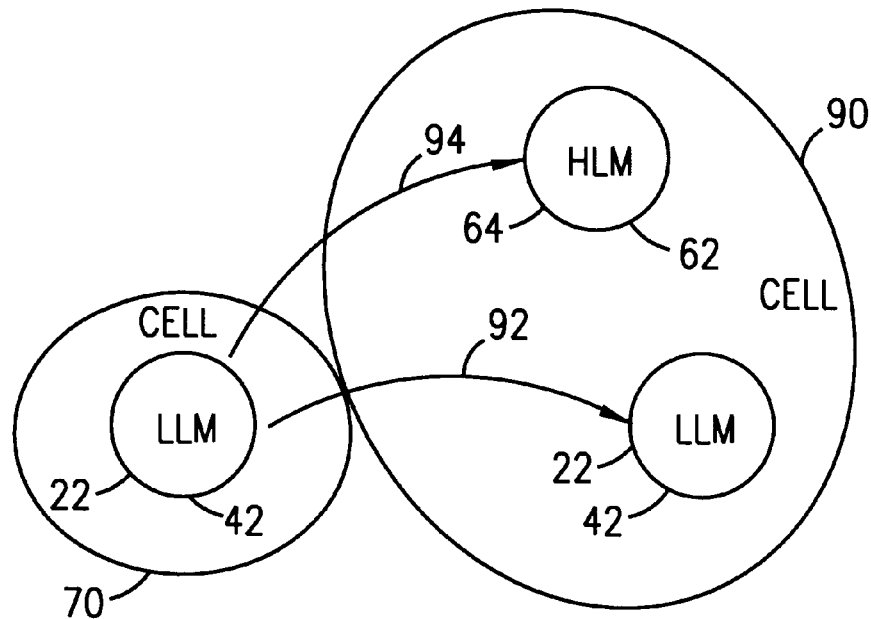
FIGS. 3A and 3B are state transition diagrams illustrating D-AMPS+ system operation using low-level modulation or high-level modulation for traffic channel communications implicating intercell modulation transitions.
Figure 3B:
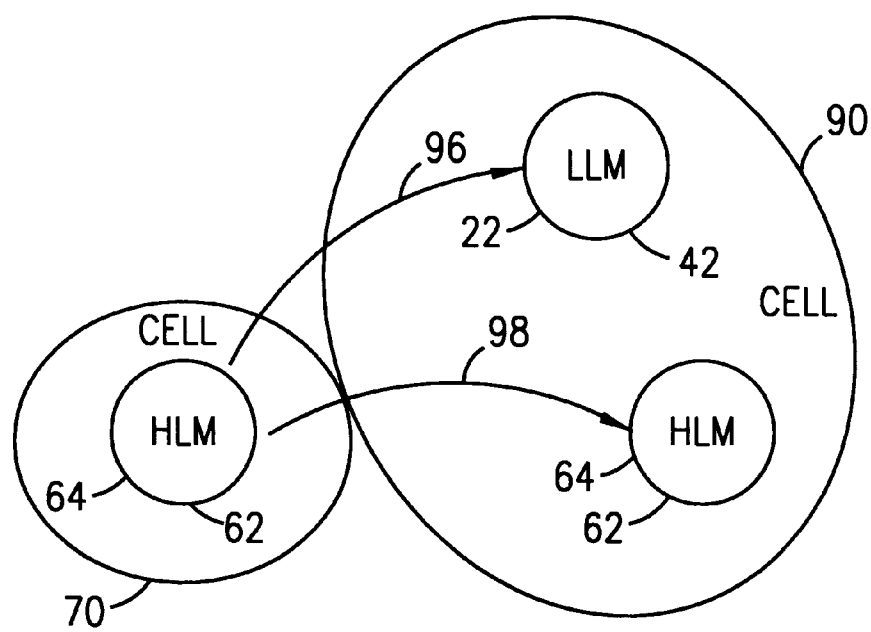

Reference is now made to FIGS. 3A and 3B wherein there are shown state transition diagrams illustrating D-AMPS+ system 52 operation using low-level modulation or high-level modulation for traffic channel communications implicating an intercell transition. In many instances, due to mobile station 54 movement and degradation of communications quality on the current channel, or changes in carrier-to-interference ratio, an intracell transition as illustrated in FIG. 2 among and between the plurality of low-level modulation traffic channels 22 or 42 and a plurality of high-level modulation traffic channels 62 or 64 supported in a given cell 70 provides an insufficient and ineffective response. In such a situation, instead of performing the intracell transition, an intercell transition must be performed to the traffic channels of another cell 90. The cells 70 and 90 may exist within a hierarchical (or layered) cell structure, perhaps partially or completely overlapping, and thus each may comprise a pico-cell, a micro-cell, a macro-cell, or an umbrella cell. The intercell transition may then accordingly occur between the cell 70 and the cell 90 which exist either on the same layer or on different layers of the hierarchical cell structure.

Turning first to FIG. 3A, it is assumed that a traffic channel communication with the mobile station 54 (perhaps following a setup 72 of FIG. 2) is being handled by one of the cell 70 supported plurality of low-level modulation traffic channels 22 or 42. In order to continue handling of the traffic channel communication as communications quality changes, an intercell transition must be performed. This transition may comprise either a transition 92 to one of the low-level modulation traffic channels 22 or 42 supported by cell 90, or a transition 94 to one of the high-level modulation traffic channels 62 or 64 supported by cell 90.

Turning next to FIG. 3B, it is assumed that a traffic channel communication with the mobile station 54 (perhaps following a setup 74 of FIG. 2) is being handled by one of the cell 70 supported plurality of high-level modulation traffic channels 62 or 64. In order to continue handling of the traffic channel communication as communications quality changes, an intercell transition must be performed. This transition may comprise either a transition 96 to one of the low-level modulation traffic channels 22 or 42 supported by cell 90, or a transition 98 to one of the high-level modulation traffic channels 62 or 64 supported by cell 90.

With reference now to both FIGS. 3A and 3B, selection of a destination for the transition 92, 94, 96 or 98 depends on a number of factors including the identified call setup 72 and 74 default implemented by the system, as well as the evaluated communications quality on the destination (or target) low-level modulation traffic channel 22 or 42 or high-level modulation traffic channel 62 pr 64 in the cell 90. In this regard, it is again noted that the call setup default is preferably a low-level modulation traffic channel 22 or 42 if the cell 90 is a large micro-cell, a macro-cell, or an umbrella cell, and preferably a high-level modulation traffic channel 62 or 64 if the cell 90 is a pico-cell or a small micro-cell. Furthermore, the evaluated factors affecting communications quality include, mobile station speed, bit error rate, word error rate, carrier-to-interference ratio, fading rate and the like.

Operation in high-level modulation is preferred, and accordingly the system first attempts to find a high-level modulation traffic channel 62 or 64 within the cell 90 with sufficient quality to perform an intercell transition 94 or 98. The mobile station 54 then switches cells and switches channels. For the transition 94, the mobile station further changes to the high-level modulation operating mode. In the transition 92, however, the mobile station maintains its low-level modulation operating mode. If a high-level modulation traffic channel 62 or 64 cannot be identified, a low-level modulation traffic channel 22 or 42 within the cell 90 with sufficient quality to perform an intercell transition 92 or 96 is found. The mobile station 54 then switches cells. For the transition 96, the mobile station further changes to the low-level modulation operating mode. In the transition 98, however, the mobile station maintains its high-level modulation operating mode.

Figure 4:
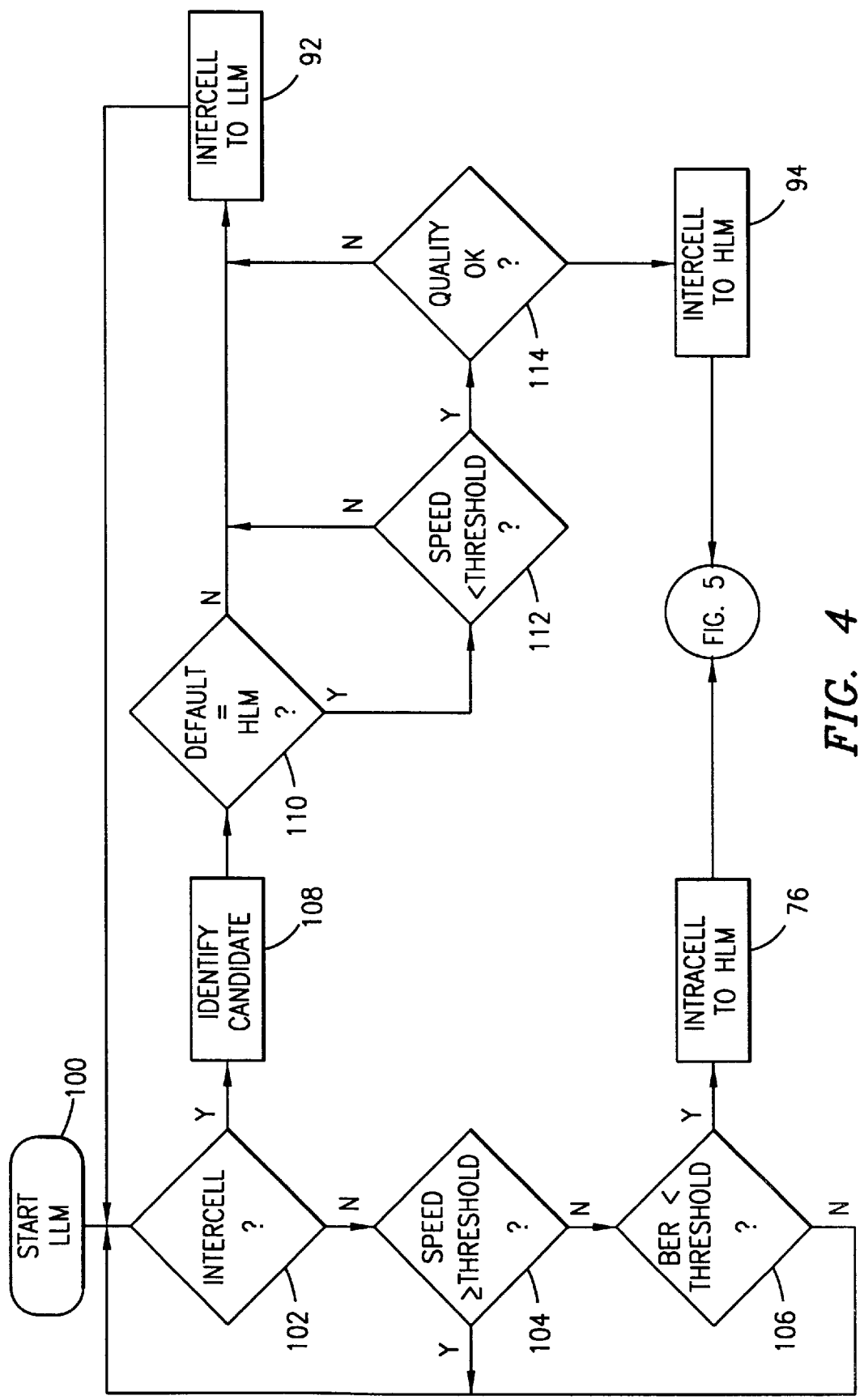
FIG. 4 is a flow diagram illustrating in more detail D-AMPS+ system operation for intracell and intercell modulation transition from a low-level modulation traffic channel.

Reference is now made to FIG. 4 wherein there is shown a flow diagram illustrating in more detail D-AMPS+ system 52 operation for intracell and intercell transition from a low-level modulation traffic channel. At start 100, the mobile station 54 is currently using a low-level modulation traffic channel 22 or 42 to handle a communication, and a transition of that communication may need to occur. At decision step 102, a determination is made as to whether an intercell transition should be made. If the answer is no, meaning that an intracell transition may need to occur, a comparison is next made in decision step 104 of the current mobile station speed to a threshold (this step is optional). If the speed does not meet or exceed the threshold, this is indicative of the fact that high-level modulation may possibly be used for communication. A comparison of the bit error rate (or other error data such as a word error rate or carrier-to-interference ratio) to a certain threshold is then made in decision step 106. If the bit error rate is less than the threshold, this confirms the acceptability of high-level modulation, and an intracell fall-forward transition 76 (FIG. 2) to the high-level modulation traffic channel 62 or 64 is performed. Following an intracell fall-forward transition 76, the procedure moves to the start of FIG. 5 (to be described). If either the speed meets or exceeds its threshold, or the bit error rate meets or exceeds its threshold, the procedure returns back to step 102.

If the determination at decision step 102 indicates that an intercell transition should be made, a candidate cell 90 for that transition is identified in step 108. A determination is then made at decision step 110 as to whether the call setup default for that cell 90 is high-level modulation. If the call setup default is high-level modulation, a comparison is next made in decision step 112 of the current mobile station speed to a threshold (this step is optional). If the speed is less than the threshold, this is indicative of the fact that high-level modulation may possibly be used for communication. The signal quality (comprising an interference measurement) on the high-level modulation traffic channel 62 or 64 in cell 90 is then evaluated in decision step 114. If the quality is sufficient, an intercell fall-forward transition 94 (FIG. 3A) is performed. Following the intercell fall-forward transition 94, the procedure moves to the start of FIG. 5 (to be described). If either the call setup default is not high-level modulation, or the speed meets or exceeds its threshold, or the quality is insufficient, an intercell transition 92 (FIG. 3A) is performed, and the procedure returns back to step 102.

Figure 5:
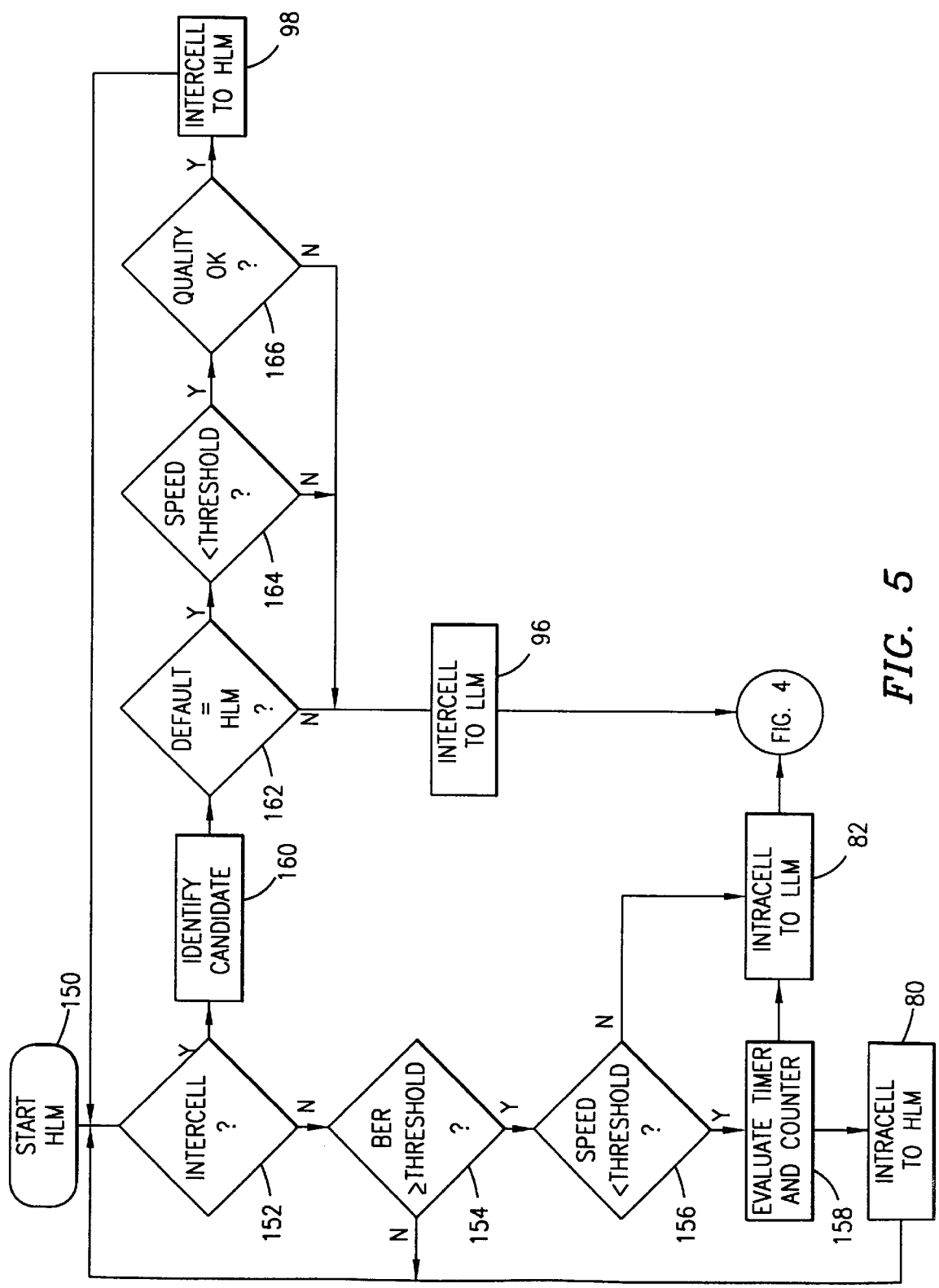
FIG. 5 is a flow diagram illustrating in more detail D-AMPS+ system operation for intracell and intercell modulation transitions from a high-level modulation packet traffic channel.

Reference is now made to FIG. 5 wherein there is shown a flow diagram illustrating in more detail D-AMPS+ system 52 operation for intracell and intercell transition from a high-level modulation traffic channel. At start 150, the mobile station 54 is currently using a high-level modulation traffic channel 62 or 64 to handle a communication, and a transition of that communication may need to occur. At decision step 152, a determination is made as to whether an intercell transition should be made. If the answer is no, meaning that an intracell transition may need to occur, a comparison of the bit error rate (or other error data such as a word error rate or carrier-to-interference ratio) to a certain threshold is made in decision step 154. If the bit error rate does not meet or exceed the threshold, no intracell transition need occur at this time, and the procedure returns back to step 152. If, however, the bit error rate does meet or exceed the threshold, this is indicative of the fact that the current high-level modulation traffic channel 62 or 64 is unacceptable. A comparison is next made in decision step 156 of the current mobile station speed to a threshold (this step is optional). If the speed meets or exceeds the threshold, this is indicative of the fact that high-level modulation should not be used for communication. Accordingly, an intracell fall-backward transition 82 (FIG. 2) to a low-level modulation traffic channel 22 or 42 occurs. The procedure then moves to the start of FIG. 4 (previously described).

If the speed is less than the threshold, this is indicative of the fact that high-level modulation is an option for an intracell transition. At branch point 158, a counter and timer are evaluated to determine whether an intracell transition 80 (FIG. 2) to another high-level modulation traffic channel 62 or 64 should occur, or an intracell fall-backward transition 82 (FIG. 2) to a low-level modulation traffic channel 22 or 42 should occur. Alternatively, the decision at branch point 158 could be made based on an interference driven channel selection method where interferences are measured and used to predict bit error rate. Selection of high-level modulation or low-level modulation traffic channels for the transition 80 or 82 would then be made from the determined bit error rates. Following an intracell transition 80, the procedure returns back to step 152. Following an intracell fall-backward transition 82, however, the procedure moves to the start of FIG. 4 (previously described).

Referring again to the decision point 158, the counter measures the number of prior intracell transitions 80 which have occurred. The timer measures the time since the last intracell transition 80 occurred. If the transition counter exceeds a threshold or the transition timer is less than a threshold, this is indicative that a further intracell transition 80 is not warranted due to the traffic disturbance that may occur with each such transition, and that an intracell fall-backward transition 82 should instead be made.

If the determination at decision step 152 indicates that an intercell transition should be made, a candidate cell 90 for that transition is identified in step 160. A determination is then made at decision step 162 as to whether the call setup default for that cell 90 is high-level modulation. If the call setup default is not high-level modulation, an intercell fall-backward transition 96 (FIG. 3B) is performed. Following an intercell fall-backward transition 96, the procedure moves to the start of FIG. 4 (previously described). If the call setup default is high-level modulation, a comparison is made in decision step 164 of current mobile station speed (this step is optional). If the speed meets or exceeds a threshold, an intercell fall-backward transition 96 occurs. Otherwise, signal quality (comprising carrier-to-interference ratio) on the high-level modulation traffic channel 62 or 64 in cell 90 is evaluated in decision step 166. If the quality is not sufficient, an intercell fall-backward transition 96 (FIG. 3B) is performed. Following an intercell fall-backward transition 96, the procedure moves to the start of FIG. 4 (previously described). If, however, the quality is sufficient, an intercell transition 98 (FIG. 3B) is performed. The procedure then returns back to step 152.

Figure 6:
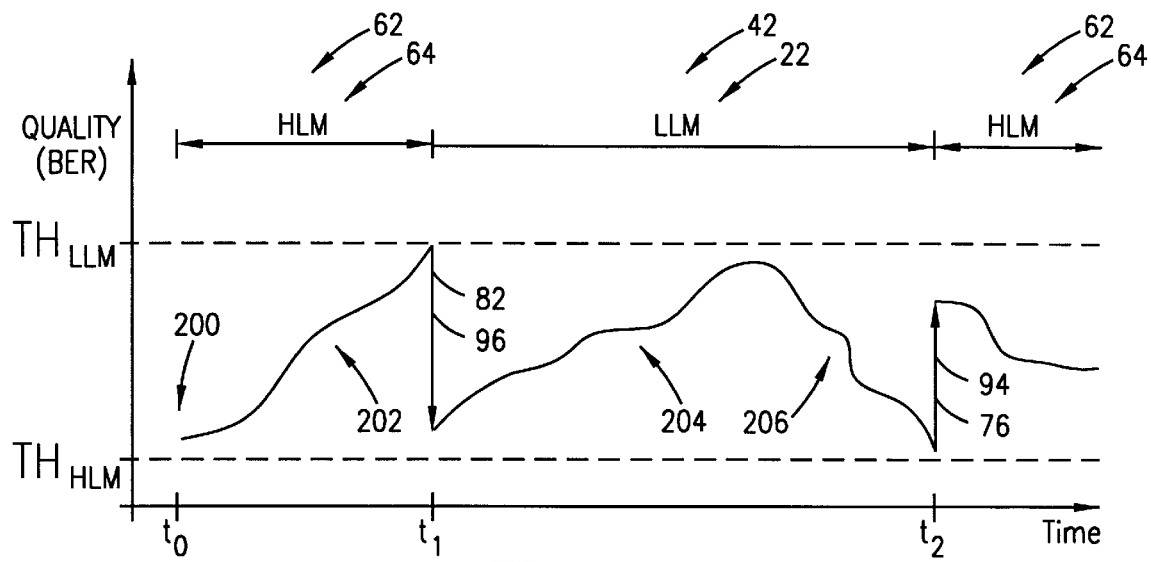
FIG. 6 is a graph of the mode transition between low-level modulation and high-level modulation for a traffic channel communication.

Reference is now made to FIG. 6 wherein there is shown a graph of the mode transition between low-level modulation and high-level modulation for an example traffic channel communication. The y-axis measures communications quality (in this case in terms of bit error rate), and the x-axis measures time regarding the duration of a communication carried by one or more traffic channels in the D-AMPS+ system 52. At the start 200 of the communication at time $t_0$, in accordance with the preference of the procedures described above, the communication is handled by a high-level modulation traffic channel 62 or 64. As the communication proceeds forward in time, an increase 202 in the bit error rate is experienced. At time $t_1$ the measured bit error rate reaches the low-level modulation threshold value $TH_{LLM}$. A fall-backward transition 82 or 96 to a low-level modulation traffic channel 22 or 42 is then performed. The bit error rate falls because the low-level modulation is more tolerant to interference. As the communication proceeds forward in time, an increase 204 followed by a decrease 206 in the bit error rate is experienced. At time $t_2$ the measured bit error rate falls to the high-level modulation threshold value $TH_{HLM}$. A fall-forward transition 76 or 94 to a high-level modulation traffic channel 62 or 64 is then performed. The bit error rate then increases because the high-level modulation is more sensitive to interference. From the foregoing, it is appreciated by one skilled in the art that a suitable gap must be chosen between the two thresholds in order to prevent oscillating transitions.

Figure 7:
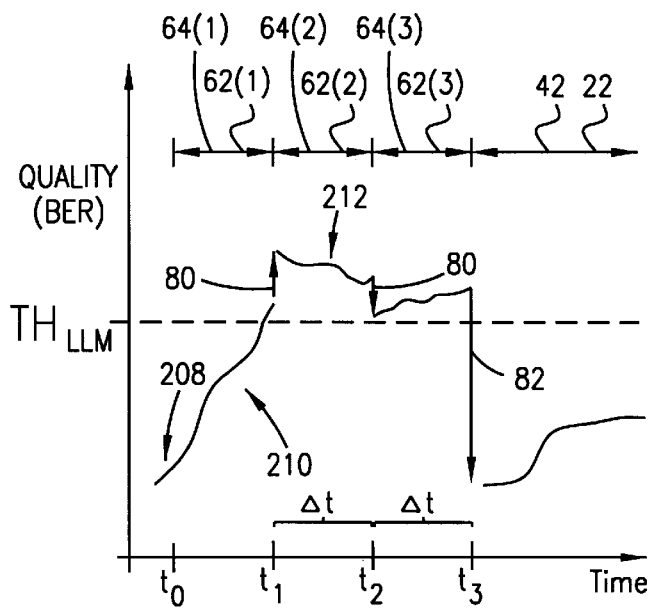
FIG. 7 is a graph of multiple transitions within a given level modulation and the mode transition from high-level modulation to low-level modulation for a traffic channel communication.

Reference is now made to FIG. 7 wherein there is shown a graph of multiple transitions within a given level modulation and the mode transition from high-level modulation to low-level modulation for an example traffic channel communication, thus illustrating the process performed at decision point 158 of FIG. 5. The y-axis measures communications quality (in this case in terms of bit error rate), and the x-axis measures time regarding the duration of a communication carried by one or more traffic channels in the D-AMPS+ system 52. At the start 208 of the communication at time $t_0$, in accordance with the preference of the procedures described above, the communication is handled by a first high-level modulation traffic channel 62(1) or 64(1). As the communication proceeds forward in time, an increase 210 in the bit error rate is experienced. At time $t_1$ the measured bit error rate reaches the low-level modulation threshold value $TH_{LLM}$. A fall-backward to low-level modulation, as in FIG. 6, is not immediately performed. Instead, a transition 80 to a second high-level modulation traffic channel 62(2) or 64(2) is performed in order to satisfy the preference for high-level modulation operation. A counter is also incremented and the transition timer (measuring $\Delta t$) is started. As the communication still proceeds forward to time $t_2 = t_1 + \Delta t$, a decrease 212 in the bit error rate is experienced, but the quality still exceeds the low-level modulation threshold value $TH_{LLM}$. Again, a transition 80 to a third high-level modulation traffic channel 62(3) or 64(3) is performed, and the counter is incremented. As the communication still proceeds forward to time $t_3 = t_2 + \Delta t$, the bit error rate remains above the low-level modulation threshold value $TH_{LLM}$. At this point, considering the counter has recorded two previous unsuccessful attempts to maintain the high-level modulation operating mode, a fall-backward transition 82 to a low-level modulation traffic channel 22 or 42 is then performed.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a mobile communications system having an air interface supporting a low-level modulation traffic channel including a plurality of first time slots and a high-level modulation traffic channel including a plurality of second time slots, a method for traffic channel transition with respect to a communication carried by a single one of the first time slots of the low-level modulation traffic channel, comprising the steps of:

monitoring communications quality on the air interface; and performing a fall-forward transition of the communication from the single one of the first time slots to a single one of the second time slots of the high-level modulation traffic channel if the communication quality is sufficient.

2. The method as in claim 1 wherein the step of monitoring communications quality comprises the step of measuring a bit error rate on the low-level modulation traffic channel utilized for the communication, and the step of performing the fall-forward transition comprises the step of transitioning the communication from the single one of the first time slots of the low-level modulation traffic channel in a currently serving cell to the single one of the second time slots of the high-level modulation traffic channel in the same cell if the bit error rate is less than an error threshold.

3. The method as in claim 1 wherein the step of monitoring communications quality comprises the step of measuring interference on the high-level modulation traffic channel of a target cell, and the step of performing the fall-forward transition comprises the step of transitioning the communication from the single one of the first time slots of the low-level modulation traffic channel in a currently serving cell to the single one of the second time slots of the high-level modulation traffic channel in the target cell if the measured interference is less than a certain threshold.

4. The method as in claim 1 wherein the step of monitoring communications quality comprises the step of measuring a bit error rate on the low-level modulation traffic channel utilized for the communication, and further including the step of transitioning the communication from the single one of the first time slots of the low-level modulation traffic channel in a currently serving cell to another single one of the first time slots of the low-level modulation traffic channel in the same cell if the bit error rate exceeds an error threshold.

5. The method as in claim 1 wherein the step of monitoring communications quality comprises the step of measuring interference on the high-level modulation traffic channel of a target cell, and further including the step of transitioning the communication from the single one of the first time slots of the low-level modulation traffic channel in a currently serving cell to a single one of the first time slots of the low-level modulation traffic channel in the target cell if the measured interference is more than a certain threshold.

6. The method as in claim 1 further comprising the step of:

monitoring speed of a mobile station engaged in the communication; and wherein the step of performing a fall-forward transition to the high-level modulation traffic channel is executed if the mobile station speed is below a speed threshold.

7. The method as in claim 1 wherein the communication on the traffic channel comprises either a data communication or a voice communication.

8. The method as in claim 1 wherein the traffic channel handling the communication is either a circuit switched channel or a packet switched channel.

9. In a mobile communications system having an air interface supporting a low-level modulation traffic channel including a plurality of first time slots and a high-level modulation traffic channel including a plurality of second time slots, a method for traffic channel transition with respect to a communication carried by a single one of the second time slots of the high-level modulation traffic channel, comprising the steps of:

monitoring communications quality on the air interface; and performing a fall-backward transition of the communication from the single one of the second time slots to a single one of the first time slots of the low-level modulation traffic channel if the communication quality is insufficient.

10. The method as in claim 9 wherein the step of monitoring communications quality comprises the step of measuring a bit error rate on the high-level modulation traffic channel utilized for the communication, and the step of performing the fall-backward transition comprises the step of transitioning the communication from the single one of the second time slots of the high-level modulation traffic channel in a currently serving cell to the single one of the first time slots of the low-level modulation traffic channel in the same cell if the bit error rate exceeds an error threshold.

11. The method as in claim 9 wherein the step of monitoring communications quality comprises the step of measuring interference on the high-level modulation traffic channel of a target cell, and the step of performing the fall-backward transition comprises the step of transitioning the communication from the single one of the second time slots of the high-level modulation traffic channel in a currently serving cell to the single one of the first time slots of the low-level modulation traffic channel in the target cell if the measured interference exceeds a certain threshold.

12. The method as in claim 9 further including the step of:

monitoring speed of a mobile station engaged in the communication; and comparing the measured speed to speed threshold; and further including the step of transitioning the communication from the single one of the second time slots of the high-level modulation traffic channel in a currently serving cell to another single one of the second time slots of high-level modulation traffic channel in the same cell if the measured speed is less than a speed threshold.

13. The method as in claim 12 further including the steps of:

counting the number of consecutive times the transition occurs from the high-level modulation traffic channel in a currently serving cell to another high-level modulation traffic channel in the same cell; and the step of performing the transition comprises the step of transitioning the communication from the single one of the second time slots of the high-level modulation traffic channel in a currently serving cell to the single one of the first time slots of the low-level modulation traffic channel in the same cell if the counted number of times exceeds a transition threshold.

14. The method as in claim 9 wherein the step of monitoring communications quality comprises the step of measuring interference on the high-level modulation traffic channel of a target cell, and further including the step of transitioning the communication from the single one of the second time slots of the high-level modulation traffic channel in a currently serving cell to a single one of the second time slots of the high-level modulation traffic channel in the target cell if the measured interference is less than a certain threshold.

15. The method as in claim 9 wherein the communication on the traffic channel comprises either a data communication or a voice communication.

16. The method as in claim 9 wherein the traffic channel handling the communication is either a circuit switched channel or a packet switched channel.

17. In a mobile communications system having an air interface supporting a low-level modulation traffic channel including a plurality of first time slots and a high-level modulation traffic channel including a plurality of second time slots in a given cell, a method for intracell transitioning of a communication among and between the low and high-level modulation traffic channels, comprising the steps of:

monitoring factors affecting communications quality on the traffic channels; and performing an intracell fall-backward transition of a communication being carried by a single one of the second time slots of the high-level modulation traffic channel to a single one of the first time slots of the low-level modulation traffic channel of the same given cell if the monitored factors indicate insufficient quality on the high-level modulation traffic channel; or performing an intracell fall-forward transition of a communication being carried by a single one of the first time slots of the low-level modulation traffic channel to a single one of the second time slots of the high-level modulation traffic channel of the same given cell if the monitored factors indicate sufficient quality on the high-level modulation traffic channel.

18. The method as in claim 17 wherein the monitored factors include at least one of the following:

speed of a mobile station engaged in the communication;

bit error rate with respect to the communication;

carrier-to-interference ratio; or interference level.

19. The method as in claim 18 wherein the step of performing the intracell fall-backward transition is effectuated if the monitored speed of the mobile station exceeds a speed threshold, or the bit error rate exceeds an error threshold, or the carrier-to-interference ratio is less than a ratio threshold, or the interference level exceeds a level threshold.

20. The method as in claim 18 wherein the step of performing the intracell fall-forward transition is effectuated if the monitored speed of the mobile station is less than a speed threshold, and the bit error rate is less than an error threshold, and the carrier-to-interference ratio exceeds a ratio threshold, or the interference level is less than a level threshold.

21. The method as in claim 18 further including the step of performing a transition of a communication being carried by a first high-level modulation traffic channel to a second high-level modulation traffic channel of the same given cell if the monitored factors indicate sufficient quality on the second high-level modulation traffic channel.

22. The method as in claim 21 further including the steps of:

counting the number of consecutive times the transition occurs between high-level modulation traffic channels in the same given cell; and performing the intracell fall-backward transition to a low-level modulation traffic channel of the same given cell if the counted number of times exceeds a transition threshold.

23. The method as in claim 21 further including the steps of:

starting a timer at each transition between high-level modulation traffic channels in the same given cell; and inhibiting performance of a subsequent transition between high-level modulation traffic channels in the same given cell until the timer expires.

24. The method as in claim 17 wherein the communication on the traffic channel comprises either a data communication or a voice communication.

25. The method as in claim 17 wherein the traffic channel handling the communication is either a circuit switched channel or a packet switched channel.

26. In a mobile communications system having an air interface supporting a low-level modulation traffic channel including a plurality of first time slots and a high-level modulation traffic channel including a plurality of second time slots in a first cell, and a low-level modulation traffic channel also including a plurality of first time slots and a high-level modulation traffic channel also including a plurality of second time slots in a second cell, a method for intercell transitioning of a communication among and between the low and high-level modulation traffic channels of the first and second cells, comprising the steps of:

monitoring factors affecting communications quality on the traffic channels; and performing an intercell fall-backward transition of a communication being carried by a single one of the second time slots of the high-level modulation traffic channel in the first cell to a single one of the first time slots of the low-level modulation traffic channel in the second cell if the monitored factors indicate insufficient quality on the high-level modulation traffic channel of the second cell; or performing an intercell fall-forward transition of a communication being carried by a single one of the first time slots of the low-level modulation traffic channel in the first cell to a single one of the second time slots of the high-level modulation traffic channel of the second cell if the monitored factors indicate sufficient quality on the high-level modulation traffic channel of the second cell.

27. The method as in claim 26 wherein the monitored factors include at least one of the following:

speed of a mobile station engaged in the communication; or interference on the high-level modulation traffic channel of the second cell.

28. The method as in claim 27 wherein the step of performing the intercell fall-backward transition is effectuated if the monitored interference on the high-level modulation traffic channel of the second cell is more than a certain threshold.

29. The method as in claim 27 wherein the step of performing the intercell fall-forward transition is effectuated if the monitored speed of the mobile station is less than a speed threshold or the monitored interference is less than a certain threshold.

30. The method as in claim 26 wherein the first cell and the second cell are cells on different layers of a multi-layer hierarchical cell structure.

31. The method as in claim 26 wherein the communication on the traffic channel comprises either a data communication or a voice communication.

32. The method as in claim 26 wherein the traffic channel handling the communication is either a circuit switched channel or a packet switched channel.

* * * * *